Figure 1:
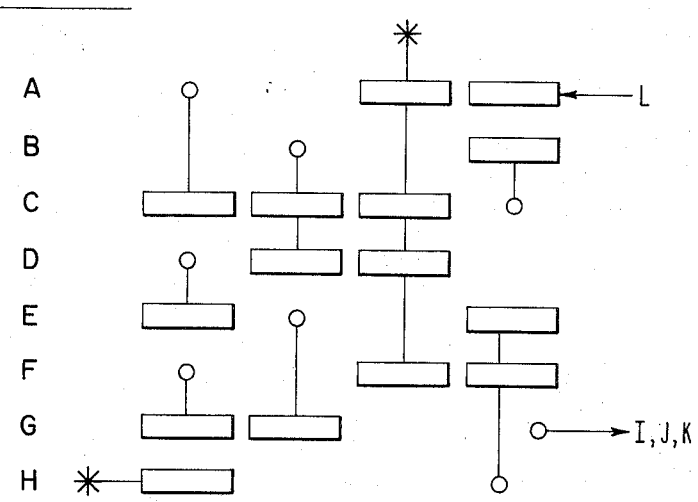
Figure 2:
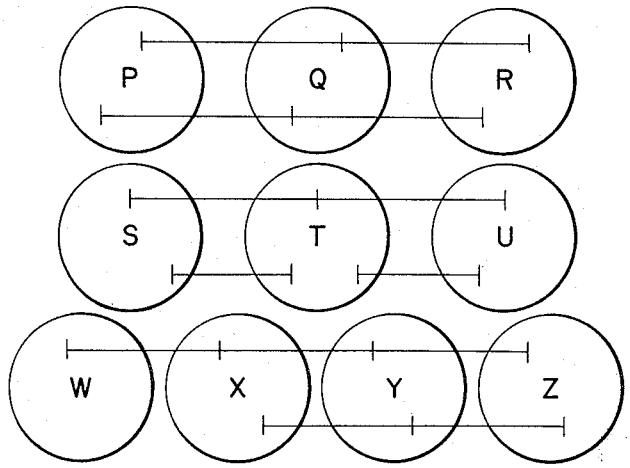
Figure 3:
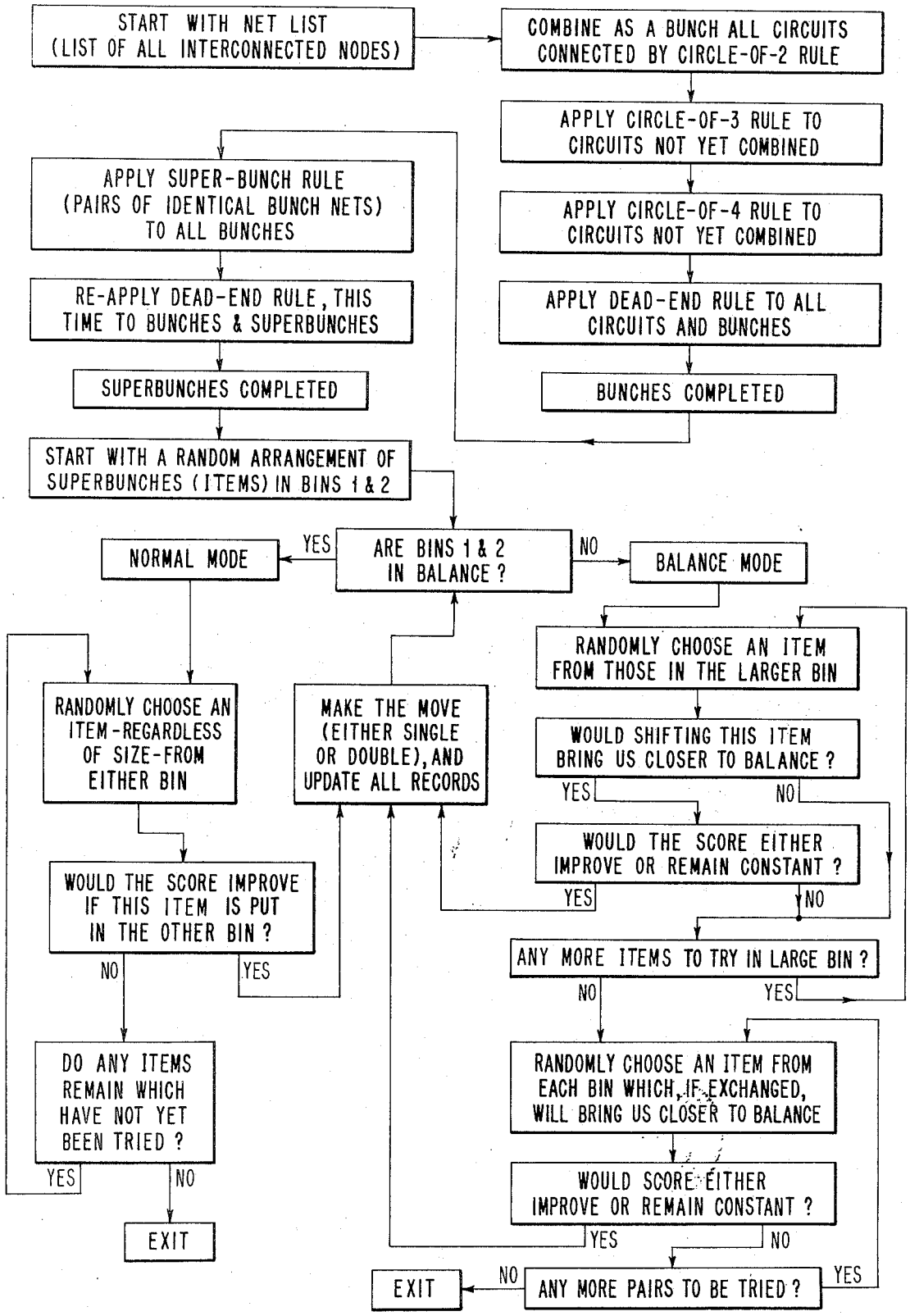

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 23, 1974

921 O.G. 1307

T921,025

NATURAL SELECTION PROGRAM OPERATIVE ON NONATOMIC OBJECTS SECURED BY BUNCHING PROGRAM

Bradford Dunham, White Plains, and James H. North, Yorktown Heights, N.Y., assignors to International Business Machines Corporation, Armonk, N.Y.

Filed June 28, 1973, Ser. No. 374,596
Int. Cl. G06f *9/12, 15/46*
U.S. Cl. 444—1
2 Sheets Drawing. 21 Pages Specification

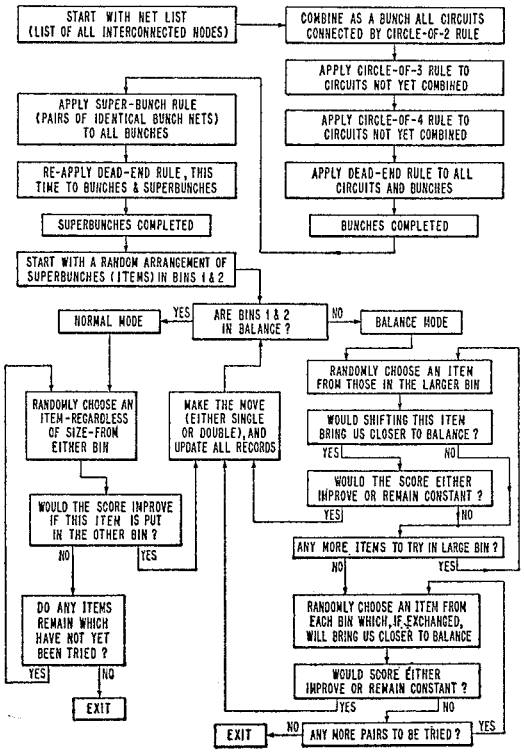

What is described is an automatic process for locating a plurality of interconnected elements that are assigned to a module, for example, circuits to chips. The innovation presented is the application of the bunching concept to what is referred to as a "natural selection" program process for optimizing such location. Groups of elements which are recognized as having close local ties are bunched and treated as a unit by a trial and error process. By having the optimization program operate on groups of elements, rather than on individual elements, a better score can be achieved due to the fact that collections of elements which sometimes resist relocations by one subpart at a time can be moved advantageously when taken as a unit. Various problems associated with having the optimization program operate on objects of radically different size are also treated in the disclosure, in particular the means that are required to obtain results whereby a correct amount of circuitry is assigned to the different subsections of the overall object designed; further, the means that are required when the fact that the objects to be located or forming a coalition are odd sized and odd shaped, when said part precludes elementary moves such as the interchange of atomic parts which plug into precise locations.

NET LIST:
1. A, C
2. B, C, D
3. C, B
4. D, E
5. E, G
6. F, G
7. G, I, J, K
8. H, E, F
9. (PAD), H
10. L, A
11. (PAD), A, C, D, F